United States Patent
Gokmen et al.

(10) Patent No.: US 11,087,204 B2
(45) Date of Patent: Aug. 10, 2021

(54) RESISTIVE PROCESSING UNIT WITH MULTIPLE WEIGHT READERS

(71) Applicant: INTERNATIONAL BUSINESS MACHINES CORPORATION, Armonk, NY (US)

(72) Inventors: Tayfun Gokmen, Briarcliff Manor, NY (US); Wilfried Haensch, Somers, NY (US); Seyoung Kim, Weschester, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 769 days.

(21) Appl. No.: 15/958,322

(22) Filed: Apr. 20, 2018

(65) Prior Publication Data
US 2019/0325291 A1      Oct. 24, 2019

(51) Int. Cl.
*G06N 3/04*       (2006.01)
*G06N 3/08*       (2006.01)

(52) U.S. Cl.
CPC ........... *G06N 3/0445* (2013.01); *G06N 3/084* (2013.01); *G06N 3/088* (2013.01)

(58) Field of Classification Search
CPC ....... G06N 3/0445; G06N 3/084; G06N 3/088
See application file for complete search history.

(56) References Cited

U.S. PATENT DOCUMENTS

| 9,584,182 B2 | 2/2017 | Fisher et al. |
| 9,646,243 B1 * | 5/2017 | Gokmen ............... G06N 3/0454 |
| 2017/0061276 A1 | 3/2017 | Riley et al. |

FOREIGN PATENT DOCUMENTS

EP      1540832 B1      6/2005

OTHER PUBLICATIONS

Chen et al., "Mapping Algorithm for Coarse-Grained Reconfigurable Multimedia Architectures," Parallel and Distributed Processing Symposium Workshops & PhD Forum (IPDPSW), 2012 IEEE 26th International. IEEE, 2012, pp. 1-6.

Gokmen et al., "Acceleration of deep neural network training with resistive cross-point devices," arXiv preprint arXiv:1603.07341, 2016, pp. 1-19.

(Continued)

*Primary Examiner* — Miranda M Huang
*Assistant Examiner* — Bart I Rylander
(74) *Attorney, Agent, or Firm* — Cantor Colburn LLP; Randall Bluestone

(57) ABSTRACT

Embodiments of the present invention include a crossbar array that includes a resistive processing unit (RPU) device at each crosspoint in the crossbar array. The RPU device includes a single weight storage element, and multiple weight reader elements. A first weight reader element is coupled with a first row wire to compute a first matrix product value using a first value and a stored value, the first value being transmitted via the first row wire and the stored value being stored in the single weight storage element. A second weight reader element is coupled with a second row wire to compute a second matrix product value of a second value and said stored value, the second value being transmitted via the second row wire.

20 Claims, 14 Drawing Sheets

(56) References Cited

OTHER PUBLICATIONS

Hurson et al., "Parallel architectures: Cache memories for dataflow systems," IEEE Parallel & Distributed Technology: Systems & Applications 4.4, 1996, pp. 50-64.

Xiao et al., "Design and Implementation of Hardware Fusion Technology for Super Sink Node," Networks Security, Wireless Communications and Trusted Computing, 2009. NSWCTC'09. International, vol. 1. IEEE, 2009, pp. 1-5.

Yong-Sheng et al.,"Study on the Multi-pipeline Reconfigurable Computing System," Computer Science and Software Engineering, 2008 International Conference on. vol. 4. IEEE, 2008, pp. 1-4.

* cited by examiner f(x) = f (INPUT 1 * CONNECTION STRENGTH 1 + INPUT 2 * CONNECTION STRENGTH 2)

Continues on next page...

RESISTIVE PROCESSING UNIT WITH MULTIPLE WEIGHT READERS

BACKGROUND

The present invention relates in general to configurations of trainable resistive crosspoint devices, which are referred to herein as resistive processing units (RPUs). More specifically, the present invention relates to artificial neural networks (ANNs) formed from crossbar arrays of resistive processing units (RPUs) that provide local data storage and local data processing without the need for additional processing elements beyond the RPU, thereby accelerating the ANN's ability to implement algorithms such as matrix multiplication, matrix decomposition and the like.

Technical problems such as character recognition and image recognition by a computer are known to be well handled by machine-learning techniques. "Machine learning" is used to broadly describe a primary function of electronic systems that learn from data. In machine learning and cognitive science, ANNs are a family of statistical learning models inspired by the biological neural networks of animals, and in particular the brain. ANNs can be used to estimate or approximate systems and functions that depend on a large number of inputs and are generally unknown. Crossbar arrays are high density, low cost circuit architectures used to form a variety of electronic circuits and devices, including ANN architectures, neuromorphic microchips and ultra-high density nonvolatile memory. A basic crossbar array configuration includes a set of conductive row wires and a set of conductive column wires formed to intersect the set of conductive row wires. The intersections between the two sets of wires are separated by so-called crosspoint devices.

SUMMARY

Embodiments of the present invention include a crossbar array that includes a resistive processing unit (RPU) device at each crosspoint in the crossbar array. The RPU device includes a single weight storage element, and multiple weight reader elements. A first weight reader element is coupled with a first row wire to compute a first matrix product value using a first value and a stored value, the first value being transmitted via the first row wire and the stored value being stored in the single weight storage element. A second weight reader element is coupled with a second row wire to compute a second matrix product value of a second value and said stored value, the second value being transmitted via the second row wire.

According to one or more embodiments of the present invention a system includes a controller, and a crossbar array coupled with the controller. The crossbar array performs a matrix-matrix multiplication, wherein the crossbar array receives a first input matrix and a second input matrix from the controller. The crossbar array includes a resistive processing unit (RPU) device at crosspoint. The RPU device includes a single weight storage element, and multiple weight reader elements. A first weight reader element is coupled with a first row wire to compute a first matrix product value using a first value and a stored value, the first value being transmitted via the first row wire and the stored value being stored in the single weight storage element. A second weight reader element is coupled with a second row wire to compute a second matrix product value of a second value and said stored value, the second value being transmitted via the second row wire.

According to one or more embodiments of the present invention a method for performing matrix-matrix multiplication includes receiving, by a crossbar array, a first input matrix and a second input matrix for performing the matrix-matrix multiplication. The method further includes performing the matrix-matrix multiplication by the crossbar array in parallel using a resistive processing unit (RPU) device at each crosspoint. The RPU device includes a single weight storage element, and multiple weight reader elements. Performing the matrix-matrix multiplication includes computing, by a first weight reader element from the multiple weight readers, the first weight reader element is coupled with a first row wire, a first matrix product value using a first value and a stored value, the first value being transmitted via the first row wire and the stored value being stored in the single weight storage element. The matrix-matrix multiplication further includes computing, by a second weight reader element from the multiple weight readers, the second weight reader element is coupled with a second row wire, a second matrix product value of a second value and said stored value, the second value being transmitted via the second row wire.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The examples described throughout the present document will be better understood with reference to the following drawings and description. The components in the figures are not necessarily to scale. Moreover, in the figures, like-referenced numerals designate corresponding parts throughout the different views.

Figure 1:
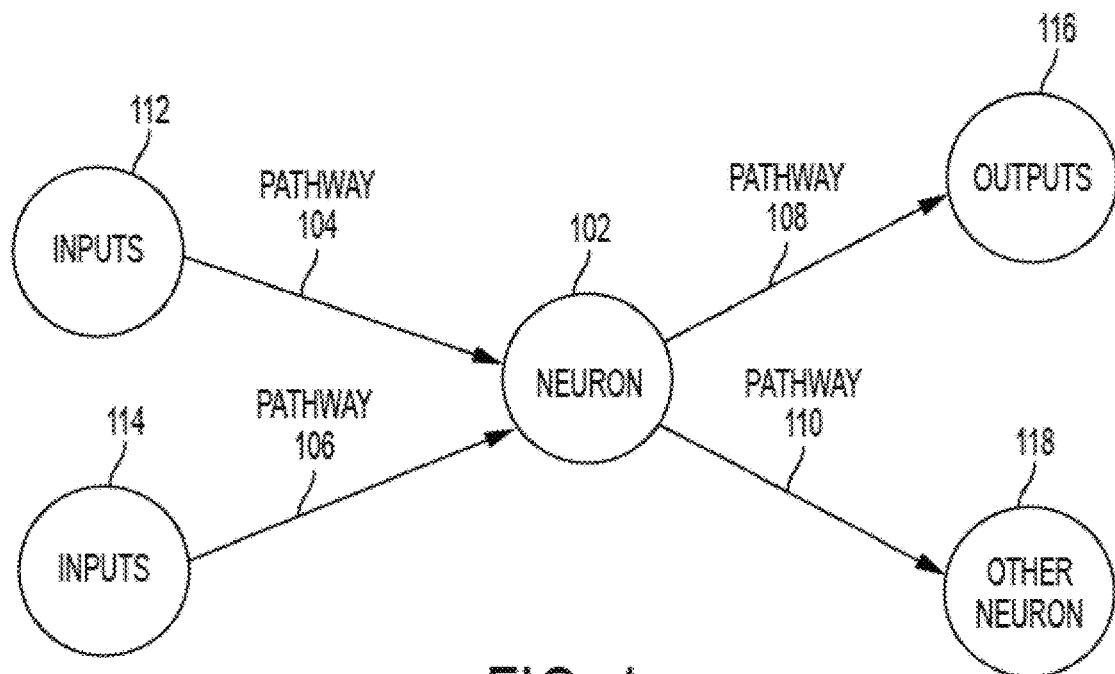
FIG. 1 depicts a simplified diagram of input and output connections of a biological neuron.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

Described herein are technical solutions for accelerating training of convolutional neural networks. The technical solutions include using RPUs, such as those configured in an RPU array for training convolutional neural networks. The RPU array can be a crosspoint arrays. As such the technical solutions are rooted in and/or tied to computer technology in order to overcome a problem specifically arising in the realm of computers, specifically training convolutional neural networks, such as by using matrix operations like matrix-matrix multiplication.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" can be understood to include any integer number greater than or equal to one, i.e. one, two, three, four, etc. The terms "a plurality" can be understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is understood in advance that although one or more embodiments are described in the context of biological neural networks with a specific emphasis on modeling brain structures and functions, implementation of the teachings recited herein are not limited to modeling a particular environment. Rather, embodiments of the present invention are capable of modeling any type of environment, including for example, weather patterns, arbitrary data collected from the internet, and the like, as long as the various inputs to the environment can be turned into a vector.

Artificial neural networks (ANNs) can be used to estimate or approximate systems and functions that depend on a large number of inputs and are generally unknown. Neural networks use a class of algorithms based on a concept of interconnected "neurons." In a typical neural network, neurons have a given activation function that operates on the inputs. By determining proper connection weights (a process also referred to as "training"), a neural network achieves efficient recognition of a desired patterns, such as images and characters. Oftentimes, these neurons are grouped into "layers" in order to make connections between groups more obvious and to each computation of values. Training the neural network is a computationally intense process.

ANNs are often embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons which can be activated by the pixels of an input image. After being weighted and transformed by a function determined by the network's designer, the activations of these input neurons are then passed to other downstream neurons, which are often referred to as "hidden" neurons. This process is repeated until an output neuron is activated. The activated output neuron determines which character was read.

Crossbar arrays, also known as crosspoint arrays or crosswire arrays, are high density, low cost circuit architectures used to form a variety of electronic circuits and devices, including ANN architectures, neuromorphic microchips and ultra-high density nonvolatile memory. A basic crossbar array configuration includes a set of conductive row wires and a set of conductive column wires formed to intersect the set of conductive row wires. The intersections between the two sets of wires are separated by so-called crosspoint devices, which can be formed from thin film material.

Crosspoint devices, in effect, function as the ANN's weighted connections between neurons. Nanoscale devices, for example memristors having "ideal" conduction state switching characteristics, are often used as the crosspoint devices in order to emulate synaptic plasticity with high energy efficiency. The conduction state (e.g., resistance) of the ideal memristor material can be altered by controlling the voltages applied between individual wires of the row and column wires. Digital data can be stored by alteration of the memristor material's conduction state at the intersection to achieve a high conduction state or a low conduction state. The memristor material can also be programmed to maintain two or more distinct conduction states by selectively setting the conduction state of the material. The conduction state of the memristor material can be read by applying a voltage across the material and measuring the current that passes through the target crosspoint device. So far, however, there have been some practical drawbacks in memristor and other resistive-random-access-memory (RRAM) based crosspoint devices that are detrimental to ANN applications; significant device-to-device variability and the asymmetry between "set (i.e. to increment resistance)" and "reset (i.e. to decrement resistance)" operations are two such main limitations.

In order to limit power consumption, the crosspoint devices of ANN chip architectures are often designed to utilize offline learning techniques, wherein the approximation of the target function does not change once the initial training phase has been resolved. Offline learning allows the crosspoint devices of crossbar-type ANN architectures to be simplified such that they draw very little power.

Notwithstanding the potential for lower power consumption, executing offline training can be difficult and resource intensive because it is typically necessary during training to modify a significant number of adjustable parameters (e.g., weights) in the ANN model to match the input-output pairs for the training data. Accordingly, simplifying the crosspoint devices of ANN architectures to prioritize power-saving, offline learning techniques typically means that training speed and training efficiency are not optimized.

Providing simple crosspoint devices that keep power consumption within an acceptable range, as well as accelerate the speed and efficiency of training ANN architectures, would improve overall ANN performance and allow a broader range of ANN applications. Accordingly, described herein are technical solutions that facilitate using and training crosspoint arrays that facilitate a parallelized matrix-matrix multiplication. Typically, RPU performs series of vector-matrix multiplication to achieve a matrix-matrix multiplication, where a first matrix is decomposed into multiple vectors. The multiple vectors in the first matrix are then multiplied by the second matrix using an RPU array, in a serial manner. Such a matrix multiplication operation, which is a frequently used operation in CNNs and other types of ANNs, reduces the overall throughput and efficiency of the system. The technical solutions described herein address such a technical challenge by facilitating the RPU array to read a weight stored in a weight storage element of a crosspoint in multiple rows of the RPU array simultaneously, and consequently facilitating multiple calculations using the weight. The technical solutions therefore facilitate a higher throughput of the RPU array during operations like matrix multiplication (and other operations). The technical solutions described herein, accordingly, improves performance of computer technology, particularly RPU arrays.

In one or more examples, weight elements are stored in a weight storage element such as a capacitor and read by a weight reader, such as a field effect transistor (FET). Alternatively, or in addition, the weight storage elements can be digital counters (e.g. J-K flip-flop based counters), a memory storage device, or any other electronic circuit that can be used for storing the weight. Here, "weight" refers to a computational value being used during computations of an ANN as described further.

Although embodiments of the present invention are directed to electronic systems, for ease of reference and explanation various aspects of the electronic systems are described using neurological terminology such as neurons, plasticity and synapses, for example. It will be understood that for any discussion or illustration herein of an electronic system, the use of neurological terminology or neurological shorthand notations are for ease of reference and are meant to cover the neuromorphic, ANN equivalent(s) of the described neurological function or neurological component.

Instead of utilizing the traditional digital model of manipulating zeros and ones, ANNs create connections between processing elements that are substantially the functional equivalent of the core system functionality that is being estimated or approximated. For example, IBM™'s SyNapse™ computer chip is the central component of an electronic neuromorphic machine that attempts to provide similar form, function and architecture to the mammalian brain. Although the IBM SyNapse computer chip uses the same basic transistor components as conventional computer chips, its transistors are configured to mimic the behavior of neurons and their synapse connections. The IBM SyNapse computer chip processes information using a network of just over one million simulated "neurons," which communicate with one another using electrical spikes similar to the synaptic communications between biological neurons. The IBM SyNapse architecture includes a configuration of processors (i.e., simulated "neurons") that read a memory (i.e., a simulated "synapse") and perform simple operations. The communications between these processors, which are typically located in different cores, are performed by on-chip network routers.

Figure 2:
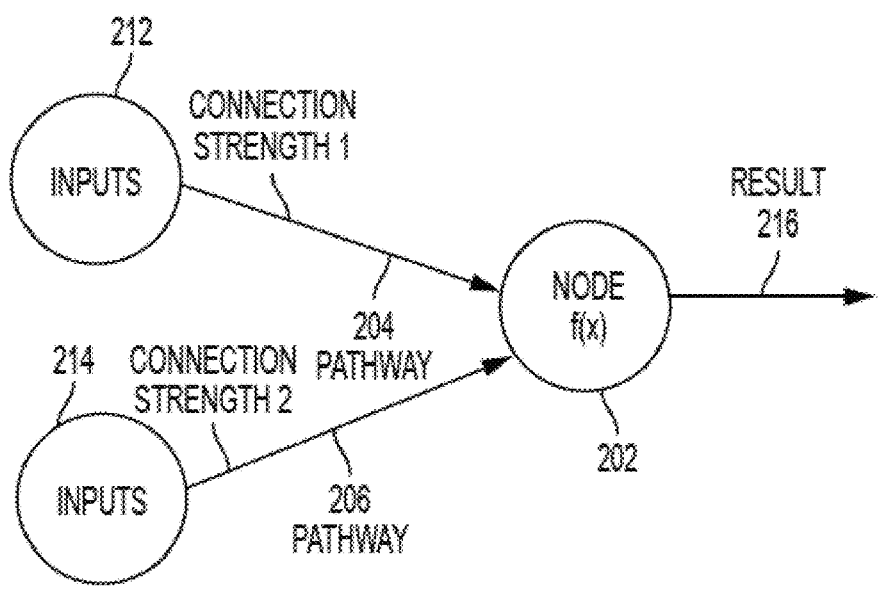
FIG. 2 depicts a known simplified model of the biological neuron shown in FIG. 1.
Figure 3:
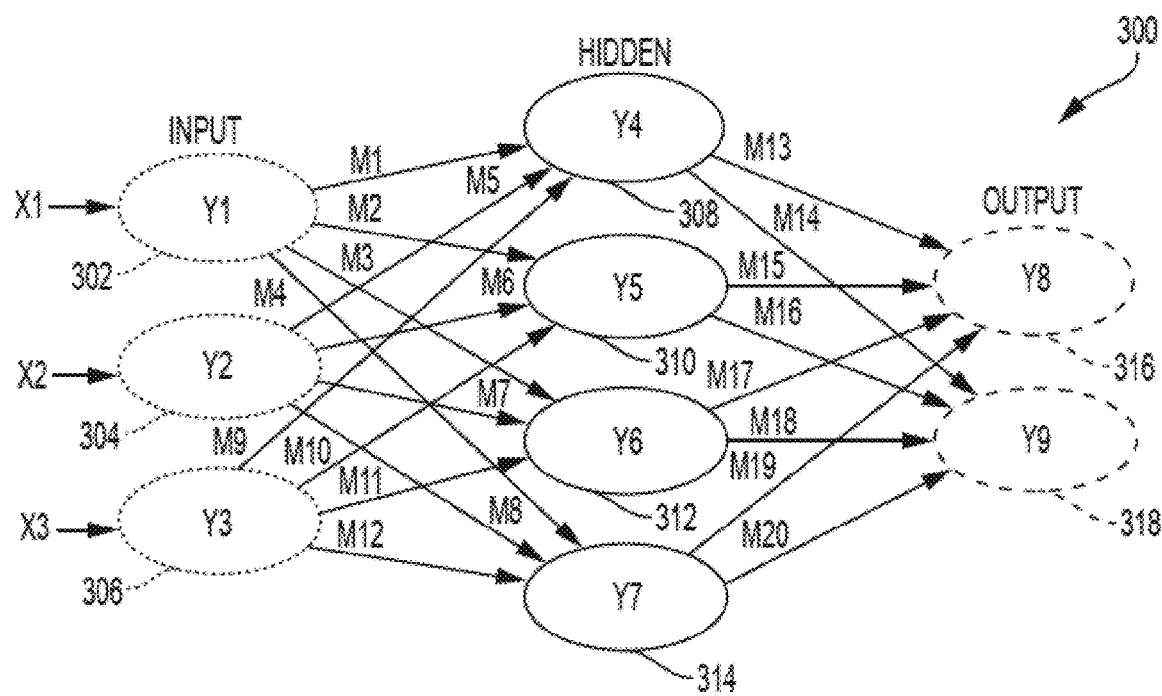
FIG. 3 depicts a known simplified model of an ANN incorporating the biological neuron model shown in FIG. 2.

A general description of how a typical ANN operates will now be provided with reference to FIGS. 1, 2 and 3. As previously noted herein, a typical ANN models the human brain, which includes about one hundred billion interconnected cells called neurons. FIG. 1 depicts a simplified diagram of a biological neuron 102 having pathways 104, 106, 108, 110 that connect it to upstream inputs 112, 114, downstream outputs 116 and downstream "other" neurons 118, configured and arranged as shown. Each biological neuron 102 sends and receives electrical impulses through pathways 104, 106, 108, 110. The nature of these electrical impulses and how they are processed in biological neuron 102 are primarily responsible for overall brain functionality. The pathway connections between biological neurons can be strong or weak. When a given neuron receives input impulses, the neuron processes the input according to the neuron's function and sends the result of the function to downstream outputs and/or downstream "other" neurons.

Biological neuron 102 is modeled in FIG. 2 as a node 202 having a mathematical function, f(x) depicted by the equation shown in FIG. 2. Node 202 takes electrical signals from inputs 212, 214, multiplies each input 212, 214 by the strength of its respective connection pathway 204, 206, takes a sum of the inputs, passes the sum through a function, f(x), and generates a result 216, which can be a final output or an input to another node, or both. In the present description, an asterisk (*) is used to represent a multiplication. Weak input signals are multiplied by a very small connection strength number, so the impact of a weak input signal on the function is very low. Similarly, strong input signals are multiplied by a higher connection strength number, so the impact of a strong input signal on the function is larger. The function f(x) is a design choice, and a variety of functions can be used. An example design choice for f(x) is the hyperbolic tangent function, which takes the function of the previous sum and outputs a number between minus one and plus one.

FIG. 3 depicts a simplified ANN model 300 organized as a weighted directional graph, wherein the artificial neurons are nodes (e.g., 302, 308, 316), and wherein weighted directed edges (e.g., m1 to m20) connect the nodes. ANN model 300 is organized such that nodes 302, 304, 306 are input layer nodes, nodes 308, 310, 312, 314 are hidden layer nodes and nodes 316, 318 are output layer nodes. Each node is connected to every node in the adjacent layer by connection pathways, which are depicted in FIG. 3 as directional arrows having connection strengths m1 to m20. Although only one input layer, one hidden layer and one output layer are shown, in practice, multiple input layers, hidden layers and output layers can be provided.

Similar to the functionality of a human brain, each input layer node 302, 304, 306 of ANN 300 receives inputs x1, x2, x3 directly from a source (not shown) with no connection strength adjustments and no node summations. Accordingly, y1=f(x1), y2=f(x2) and y3=f(x3), as shown by the equations listed at the bottom of FIG. 3. Each hidden layer node 308, 310, 312, 314 receives its inputs from all input layer nodes 302, 304, 306 according to the connection strengths associated with the relevant connection pathways. Thus, in hidden layer node 308, y4=f(m1*y1+m5*y2+m9*y3), wherein * represents a multiplication. A similar connection strength multiplication and node summation is performed for hidden layer nodes 310, 312, 314 and output layer nodes 316, 318, as shown by the equations defining functions y5 to y9 depicted at the bottom of FIG. 3.

ANN model 300 processes data records one at a time, and it "learns" by comparing an initially arbitrary classification of the record with the known actual classification of the record. Using a training methodology knows as "backpropagation" (i.e., "backward propagation of errors"), the errors from the initial classification of the first record are fed back into the network and used to modify the network's weighted connections the second time around, and this feedback process continues for many iterations. In the training phase of an ANN, the correct classification for each record is known, and the output nodes can therefore be assigned "correct" values. For example, a node value of "1" (or 0.9) for the node corresponding to the correct class, and a node value of "0" (or 0.1) for the others. It is thus possible to compare the network's calculated values for the output nodes to these "correct" values, and to calculate an error term for each node (i.e., the "delta" rule). These error terms are then used to adjust the weights in the hidden layers so that in the next iteration the output values will be closer to the "correct" values.

There are many types of neural networks, but the two broadest categories are feed-forward and feedback/recurrent networks. ANN model 300 is a non-recurrent feed-forward network having inputs, outputs and hidden layers. The signals can only travel in one direction. Input data is passed onto a layer of processing elements that perform calculations. Each processing element makes its computation based upon a weighted sum of its inputs. The new calculated values then become the new input values that feed the next layer. This process continues until it has gone through all the layers and determined the output. A threshold transfer function is sometimes used to quantify the output of a neuron in the output layer.

A feedback/recurrent network includes feedback paths, which mean that the signals can travel in both directions using loops. All possible connections between nodes are allowed. Because loops are present in this type of network, under certain operations, it can become a non-linear dynamical system that changes continuously until it reaches a state of equilibrium. Feedback networks are often used in associative memories and optimization problems, wherein the network looks for the best arrangement of interconnected factors.

The speed and efficiency of machine learning in feed-forward and recurrent ANN architectures depend on how effectively the crosspoint devices of the ANN crossbar array perform the core operations of typical machine learning algorithms. Although a precise definition of machine learning is difficult to formulate, a learning process in the ANN context can be viewed as the problem of updating the crosspoint device connection weights so that a network can efficiently perform a specific task. The crosspoint devices typically learn the necessary connection weights from available training patterns. Performance is improved over time by iteratively updating the weights in the network. Instead of following a set of rules specified by human experts, ANNs "learn" underlying rules (like input-output relationships) from the given collection of representative examples. Accordingly, a learning algorithm can be generally defined as the procedure by which learning rules are used to update and/or adjust the relevant weights.

The three main learning algorithm paradigms are supervised, unsupervised and hybrid. In supervised learning, or learning with a "teacher," the network is provided with a correct answer (output) for every input pattern. Weights are determined to allow the network to produce answers as close as possible to the known correct answers. Reinforcement learning is a variant of supervised learning in which the network is provided with only a critique on the correctness of network outputs, not the correct answers themselves. In contrast, unsupervised learning, or learning without a teacher, does not require a correct answer associated with each input pattern in the training data set. It explores the underlying structure in the data, or correlations between patterns in the data, and organizes patterns into categories from these correlations. Hybrid learning combines supervised and unsupervised learning. Parts of the weights are usually determined through supervised learning, while the others are obtained through unsupervised learning.

The use of neural networks, particularly with convolutional layers, has driven progress in deep learning. Such neural networks are referred to as convolutional neural networks (CNN). In a CNN, kernels convolute overlapping regions in a visual field, and accordingly emphasize the importance of spatial locality in feature detection. Computing the convolutional layers of the CNN, typically, encompasses more than 90% of computation time in neural network training and inference. The training for example, depending on the size of the training dataset that is being used, can be a week or longer. Thus, accelerating the CNN training, as described by the examples of the technical solutions herein, is a desirable improvement.

Figure 4:
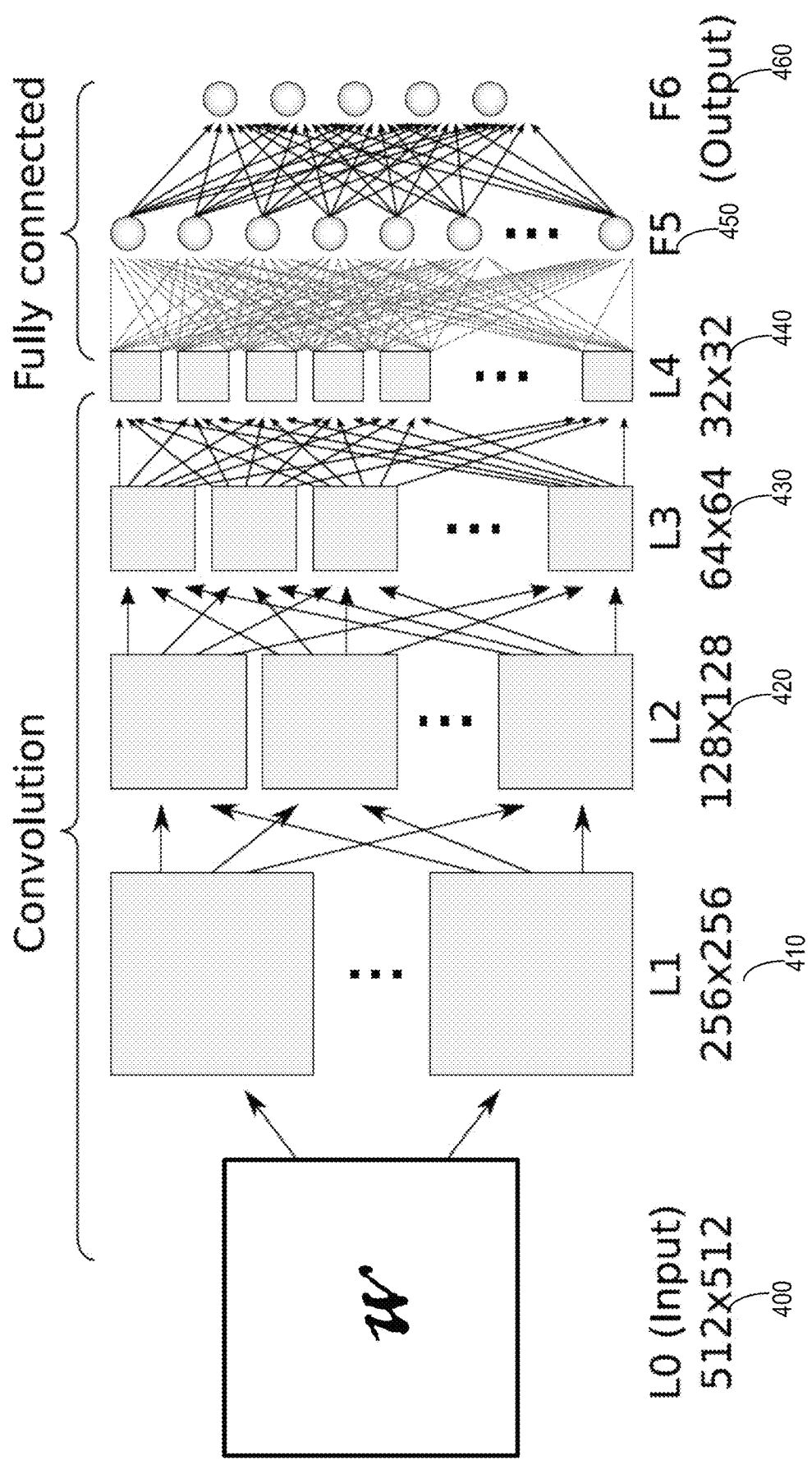
FIG. 4 illustrates a simplified block diagram of a CNN, which is interpreting a sample input map.

FIG. 4 illustrates a simplified block diagram of a CNN, which is interpreting a sample input map 400. This particular example uses a handwritten letter "w" as an input map, however, it is understood that other types of input maps are possible. In the illustrated example, the input map 100 is used to create a set of values for the input layer 410, or "layer-1." For example, layer-1 can be generated by direct mapping of a pixel of the sample input map 400 to a particular neuron in layer-1, such that the neuron shows a 1 or a 0 depending on whether the pixel exhibits a particular attribute. Another example method of assigning values to neurons is discussed below with reference to convolutional neural networks. Depending on the vagaries of the neural network and the problem it is created to solve, each layer of the network can have differing numbers of neurons, and these may or may not be related to particular qualities of the input data.

Referring to FIG. 4, neurons in layer-1 410 are connected to neurons in a next layer, layer-2 420, as described earlier (see FIG. 3). The neurons in FIG. 4 are as described with reference to FIG. 1. A neuron in layer-2 420, consequently, receives an input value from each of the neurons in layer-1 410. The input values are then summed and this sum compared to a bias. If the value exceeds the bias for a particular neuron, that neuron then holds a value, which can be used as input to neurons in the next layer of neurons. This computation continues through the various layers 430-450 of the CNN, until it reaches a final layer 460, referred to as "output" in FIG. 4. In an example of a CNN used for character recognition, each value in the layer is assigned to a particular character. The network is configured to end with the output layer having only one large positive value in one neuron, which then demonstrates which character the network has computed to be the most likely handwritten input character.

The data values for each layer in the CNN is typically represented using matrices (or tensors in some examples) and computations are performed as matrix computations. The indexes (and/or sizes) of the matrices vary from layer to layer and network to network, as illustrated in FIG. 4. Different implementations orient the matrices or map the matrices to computer memory differently. Referring to FIG. 4, in the example CNN illustrated, each level is a matrix of neuron values, as is illustrated by matrix dimensions for each layer of the neural network. The values in a matrix at a layer are multiplied by connection strengths, which are in a transformation matrix. This matrix multiplication scales each value in the previous layer according to the connection strengths, and then summed. A bias matrix is then added to the resulting product matrix to account for the threshold of each neuron in the next level. Further, an activation function is applied to each resultant value, and the resulting values are placed in the matrix for the next layer. In an example, the activation function can be rectified linear units, sigmoid, or tan h( ). Thus, as FIG. 4 shows, the connections between each layer, and thus an entire network, can be represented as a series of matrices. Training the CNN includes finding proper values for these matrices.

While fully-connected neural networks are able, when properly trained, to recognize input patterns, such as handwriting, they can fail to take advantage of shape and proximity when operating on input. For example, because every pixel is operated on independently, the neural network can ignore adjacent pixels. A CNN, in comparison, operates by associating an array of values, rather than a single value, with each neuron. Conceptually, the array is a subset of the input pattern, or other parts of the training data. The transformation of a neuron value for the subsequent layer is generated using convolution. Thus, in a CNN the connection strengths are convolution kernels rather than scalar values as in a full-network.

Figure 5:
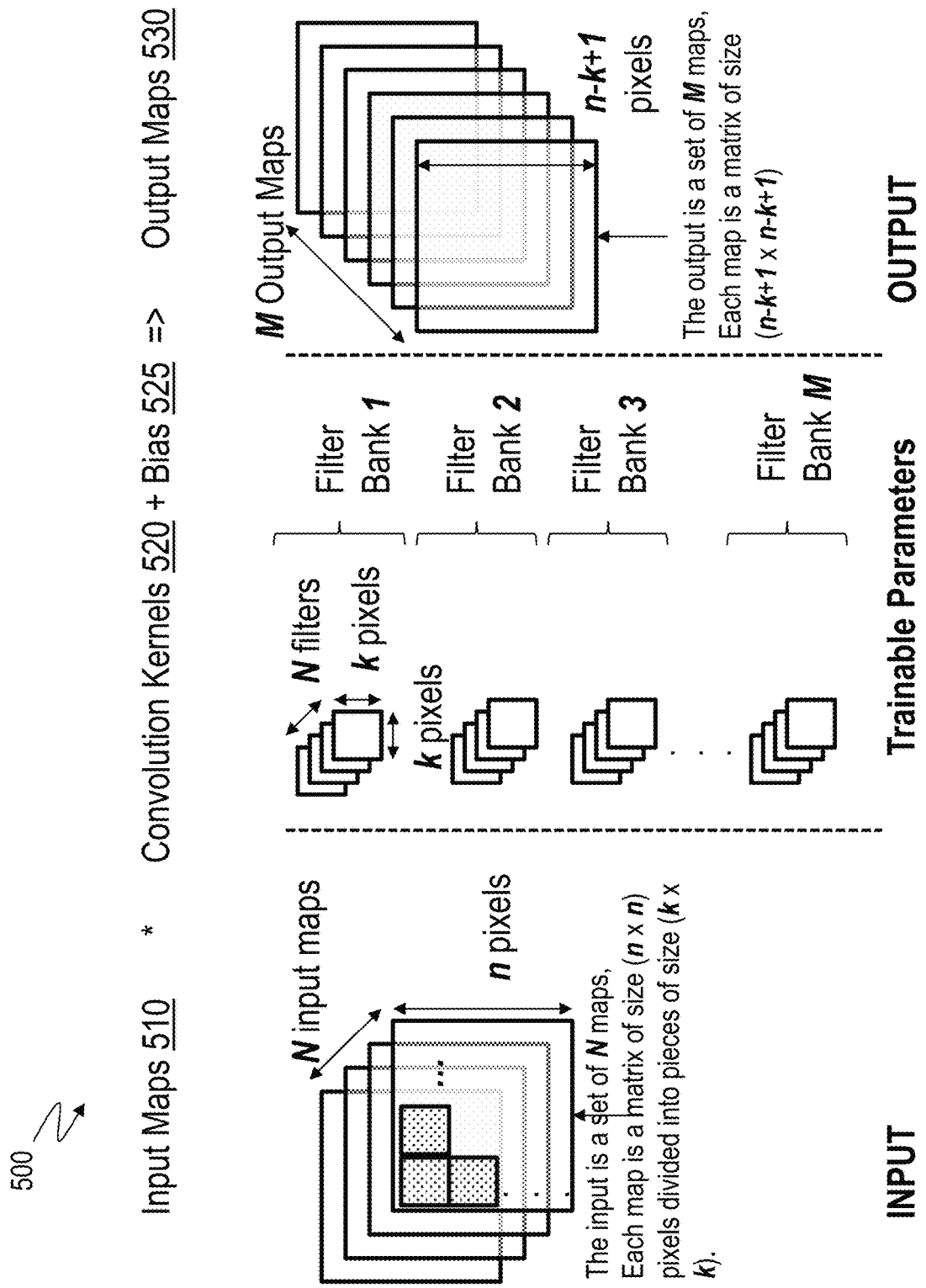
FIG. 5 illustrates an example convolutional layer in a CNN being trained using training data that includes input maps and convolution kernels.

FIG. 5 illustrates an example convolutional layer 500 in a CNN being trained using training data that includes input maps 510 and convolution kernels 520. For simplicity, FIG. 5 does not illustrate bias matrices 525. The input maps 510 can include multiple input patterns, for example N input maps. Each input map is a matrix, such as a square matrix of size n×n. The input maps are convolved with convolution kernels 520 of size k×k as illustrated to produce M output maps 530 of size n−k+1×n−k+1. Each convolution is a 3D convolution involving the N input maps. It should be noted that, in other examples, the input maps 510, the kernels 520, and the output maps 530 are not square matrices. A CNN can include multiple such layers, where the output maps 530 from a previous layer are used as input maps 510 for a subsequent layer. The backpropagation algorithm can be used to learn the weight values of the k×k×M×N filters.

For example, the input maps 510 are convolved with each filter bank to generate a corresponding output map. For example, in case the CNN is being trained to identify handwriting, the input maps 510 are combined with a filter bank that includes convolution kernels representing a vertical line. The resulting output map identifies vertical lines that are present in the input maps 510. Further, another filter bank can include convolution kernels representing a diagonal line, such as going up and to the right. An output map resulting from a convolution of the input maps 510 with the second filter bank identifies samples of the training data that contain diagonal lines. The two output maps show different information for the character, while preserving pixel adjacency. This can result in more efficient character recognition.

Figure 6:
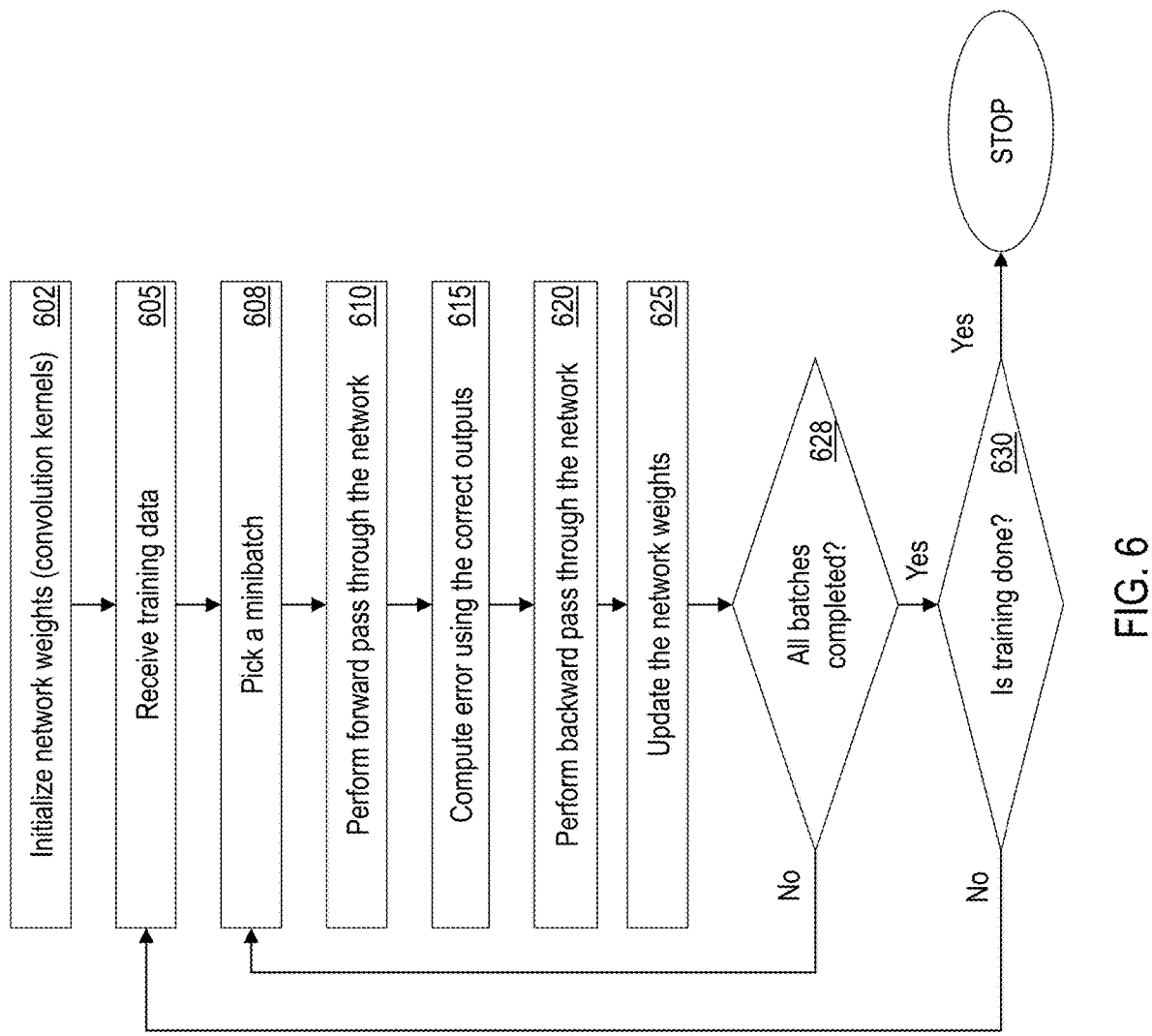
FIG. 6 illustrates an example flowchart for training a CNN with one or more convolutional layers.

FIG. 6 illustrates an example flowchart for training a CNN with one or more convolutional layers 500. The example logic can be implemented by a processor, such as a central processing unit (CPU), a graphics processing unit (GPU), a digital signal processor (DSP), or any other processor or a combination thereof. Alternatively or in addition, the training can be performed by a system that is equipped with an RPU array as described herein. The CNN can be initialized using random weights for the neurons, as shown at block 602. The training data for the CNN 300 is received, as shown at block 605. In an example, the CNN can be pre-set with sample convolutional kernels and biases, which are refined to give consistent and efficient results. The training data typically includes many (on the order of tens of thousands) input training samples 400, which are associated with an expected output 460. For example, the inputs samples 400 can be samples of handwritten samples and the expected outputs 460 can be an indication of the correct character each should be interpreted as. It is understood that recognition of handwritten characters is just an example of using CNNs and that other examples can train the CNN for other technical problems.

In one or more embodiments, the CNN training is performed using batches. Accordingly, a batch of the input data to be used for training is selected, as shown at block 608. Using the input maps 410 and the convolutional kernels 420, the output maps 430 are generated as described herein, as shown at block 610. Generating the output maps 330 is commonly referred to as a "forward pass." Further, the method includes using the output maps 430, to determine how close or far off of the expected character recognition and the CNN was, as shown at block 615. A degree of error with relation to each of the matrices, which include the CNN is determined, such as using a gradient descent. Determining the relative errors is referred to as a "backward pass." The method further includes modifying or updating the matrices to adjust for the error, as shown at block 625. The adjusting the convolution kernels 420 based on the output error information and using it to determine modifications for each neural network matrix, is referred to as an "update pass." The gradient function, in an example, includes partial derivatives for each entry of each neural network matrix with respect to the error. The gradient function represents how much to adjust each matrix according to the gradient descent method. The processor subsequently modifies the matrices, including the convolutional kernels and the biases, according to the gradient function, as shown at block 625. The processor ensures that all batches of the data are used for the training, as shown at block 628.

The modified convolutional kernels 420 after being adjusted can be used for further training of the CNN, unless the training is deemed completed, as shown at block 630. For example, the training can be deemed completed if the CNN identifies the inputs according to the expected outputs with a predetermined error threshold. If the training is not yet completed, another iteration, or training epoch is performed using the modified convolutional kernels from the most recent iteration.

Thus, according to the CNN training above, the CNN learns to model a dependency between the inputs and the expected outputs in the training data.

Mathematically, for a vector of input maps S and a vector of outputs X, the CNN learns a model to reduce an error E between S and X. One such error function is the mean square error between S and X, for example:

$$E = \Sigma_t \|f(S(t)) - X(t)\|^2$$

Other error functions can include, for example, cross-entropy or logistic loss.

The CNN, for each layer, adapts a matrix of weights A and a vector of biases a to optimize E. To this end, in the forward pass, a value for each value of a next layer (B, b) is calculated using values of the current layer (A, a). For example, the computations in the forward pass for a layer can be represented as X=f(S)=Bφ(AS+a)+b, where, A is the matrix of weights of a current layer, a is a bias vector of the current layer, and B and b are weight matrix and bias of the next layer of the CNN. The function φ represents an element-wise non-linear relation. In the forward pass, the predicted outputs corresponding to the inputs are evaluated according to the above equation. In the backward pass, partial derivatives of the cost function (E) with respect to the different parameters are propagated back through the CNN. The network weights are then be updated using a gradient-based optimization algorithm, such as the gradient descent. The whole process is iterated until the weights have converged. This approach is computationally rather intensive. Training a CNN in the above method is a time consuming process because the forward, backward, and update passes involve convolution operations.

Figure 7A:
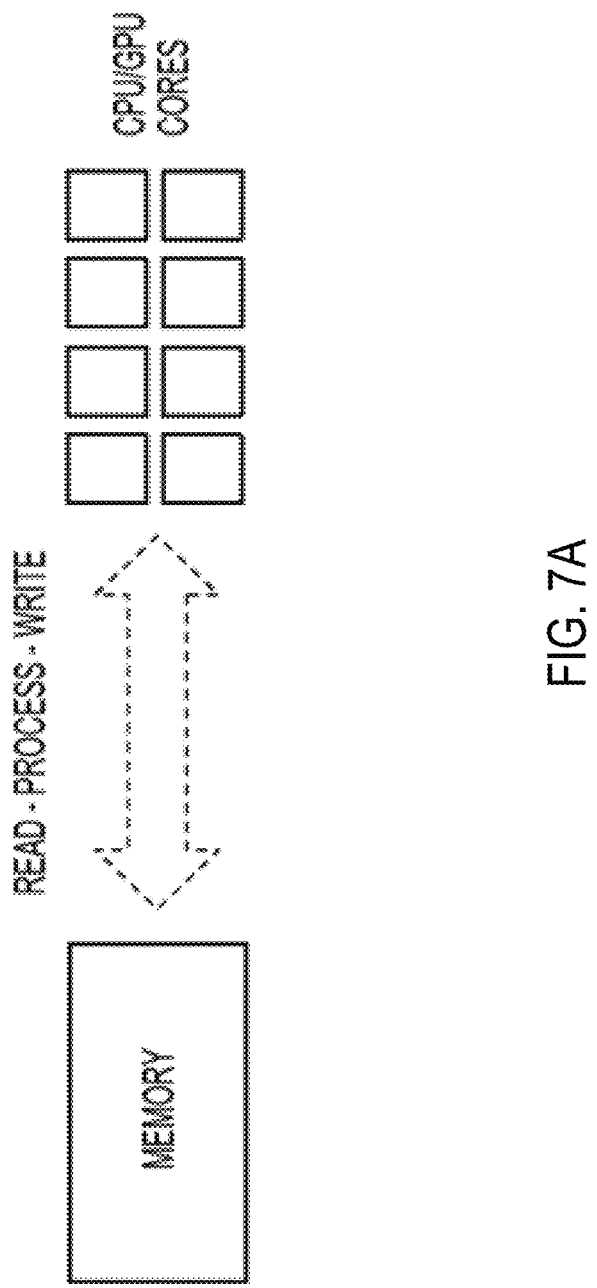
FIG. 7A depicts a simplified illustration of a typical read-process-write weight update operation.

FIG. 7A depicts a simplified illustration of a typical read-process-write weight update operation, wherein CPU/GPU cores (i.e., simulated "neurons") read a memory (i.e., a simulated "synapse") and perform weight update processing operations, then write the updated weights back to memory. Executing offline training can be difficult and resource intensive because it is typically necessary during training to modify a significant number of adjustable parameters (e.g., weights) in the CNN model to match the input-output pairs for the training data. In one or more examples, crosspoint array that includes a plurality of crosspoint devices is used for training the CNN. The crosspoint array can be part of a chip, such as an ANN chip. In order to limit power consumption, the crosspoint devices of ANN chip architectures are often designed to utilize offline learning techniques, wherein the approximation of the target function does not change once the initial training phase has been resolved. Offline learning allows the crosspoint devices of crossbar-type ANN architectures to be simplified such that they draw very little power. Accordingly, simplifying the crosspoint devices of ANN architectures to prioritize power-saving for offline learning techniques typically means that training speed and training efficiency for CNNs are not optimized. Providing crosspoint devices that keep power consumption within an acceptable range, as well as accelerate the speed and efficiency of training CNN architectures, would improve overall CNN performance and allow a broader range of CNN applications.

Figure 7B:
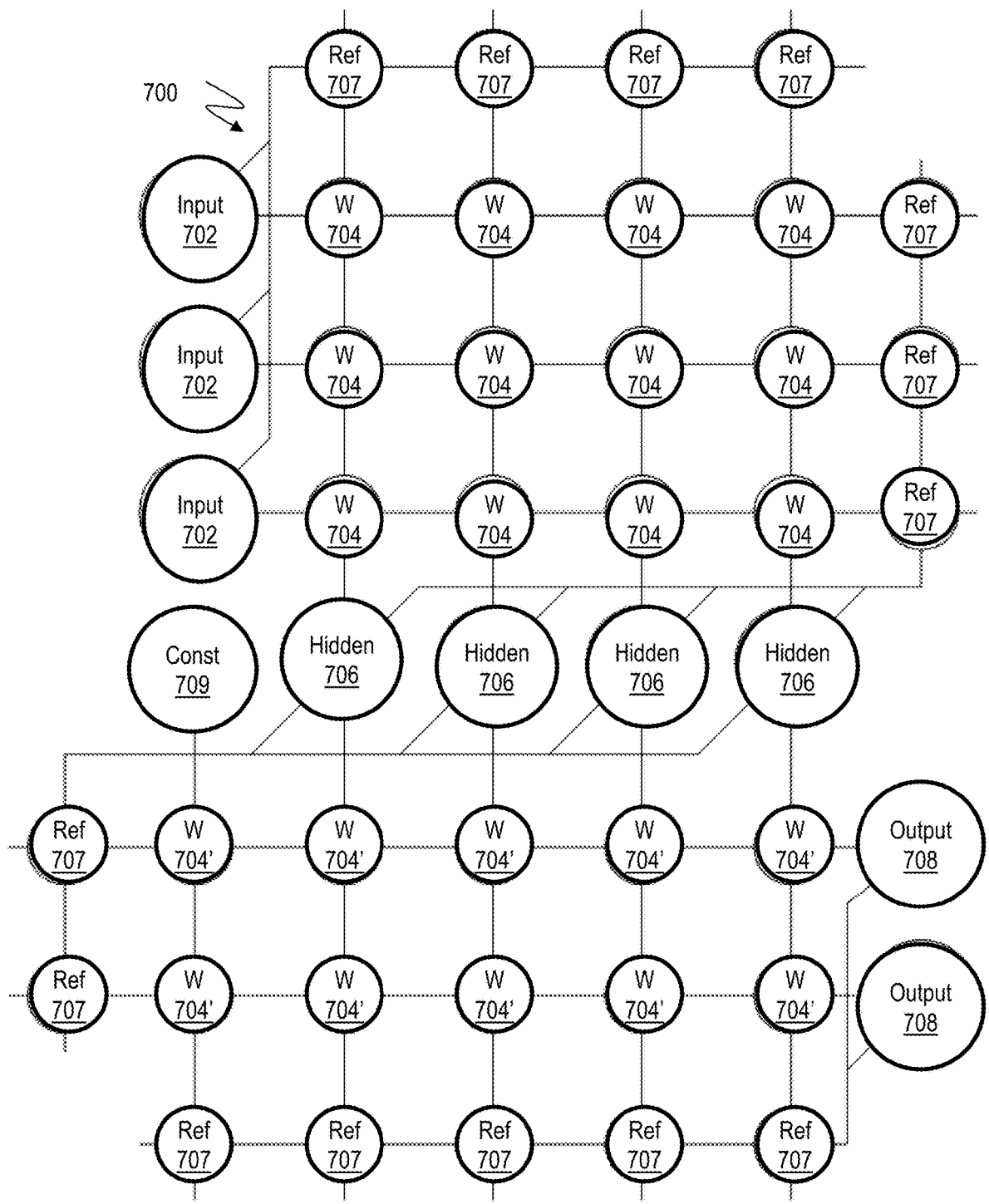
FIG. 7B illustrates an artificial neural network (ANN) architecture.

FIG. 7B illustrates an artificial neural network (ANN) architecture 700. During feed-forward operation, a set of input neurons 702 each provide an input voltage in parallel to a respective row of weights 704. A weight 704 is a crosspoint device, such as an RPU device. The weights 704 each have a settable resistance value, such that a current output flows from the weight 704 to a respective hidden neuron 706 to represent the weighted input. The current output by a given weight is determined as $$I = \frac{V}{r},$$

where V is the input voltage from the input neuron 702 and r is the set resistance of the weight 704. The current from each weight adds column-wise and flows to a hidden neuron 706.

The hidden neurons 706 use the currents from the array of weights 704 to perform some calculation. The hidden neurons 706 then output a voltage of their own to another array of weights 704'. This array performs in the same way, with a column of weights 704' receiving a voltage from their respective hidden neuron 706 to produce a weighted current output that adds row-wise and is provided to the output neuron 708.

It should be understood that any number of these stages can be implemented, by interposing additional layers of arrays and hidden neurons 706.

During back propagation, the output neurons 708 provide a voltage back across the array of weights 704'. The output layer compares the generated network response to training data and computes an error. The error is applied to the array as a voltage pulse, where the height and/or duration of the pulse is modulated proportional to the error value. In this example, a row of weights 704' receives a voltage from a respective output neuron 708 in parallel and converts that voltage into a current which adds column-wise to provide an input to hidden neurons 706. The hidden neurons 706 combine the weighted feedback signal with a derivative of its feed-forward calculation and stores an error value before outputting a feedback signal voltage to its respective column of weights 704. It should be noted that the weights 704' operate in the same manner as the weights 704; the labeling is provided to indicate that weights 704 are between layers of neurons 702 and neurons 706, and weights 704' are between layers of neurons 706 and 708. This back propagation travels through the entire network 700 until all hidden neurons 706 and the input neurons 702 have stored an error value.

During weight updates, the input neurons 702 and hidden neurons 706 apply first weight update voltages to the crosspoint array of weights 704 and the output neurons 708 and hidden neurons 706 apply second weight update voltages to the crosspoint array of weights 704' through the network 700. Further, during the update phase of the weights 704, the input layer 702 applies voltage pulses (row-wise) proportional to the input values, and the layer 706 applies voltage pulses proportional to the error values of the hidden layer 706 (column-wise). Further yet, during update phase of the neurons 704', hidden layer 706 applies voltage pulses proportional to its feed-forward output values (column-wise), and the output layer 708 applies voltage pulses proportional to the error of the output layer 708 (row-wise). The combinations of these voltages create a state change within each weight 704, 704', causing the weight 704, 704' to take on a new counter-value, which in turn changes the resistance value. In this manner, the weights 704, 704' can be trained to adapt the neural network 700 to errors in its processing. It should be noted that the three modes of operation, feed forward, back propagation, and weight update, do not overlap with one another.

Turning now to an overview of the present invention, one or more embodiments are directed to a programmable resistive crosspoint component referred to herein as a crosspoint device, or a resistive processing unit (RPU), which provides local data storage functionality and local data processing functionality. In other words, when performing data processing, the value stored at each RPU is updated in parallel and locally, which eliminate the need to move relevant data in and out of a processor and a separate storage element. Additionally, the local data storage and local data processing provided by the described RPUs accelerate the ANN's ability to implement algorithms such as matrix inversion, matrix decomposition and the like. Accordingly, implementing a machine learning ANN architecture having the described RPU enables the implementation that optimize the speed, efficiency and power consumption of the ANN. The described RPU and resulting ANN architecture improve overall ANN performance and enable a broader range of practical ANN applications.

The described RPU can be implemented as two-terminal resistive crosspoint devices, wherein their switching characteristics have a non-linearity that can be used for processing data. Thus, the described RPU can be implemented by a two-terminal device having an appropriate update characteristic that can be used to perform analog multiplication and update. For example, the described RPU device can be implemented with resistive random access memory (RRAM), phase change memory (PCM), programmable metallization cell (PMC) memory, memristive systems, or any other two-terminal device that has resistive switching characteristics. The two-terminal RPUs provide local data storage functionality and local data processing functionality without the necessity of extra circuit elements such as transistors and off-chip storage and/or processing components.

Figure 8:
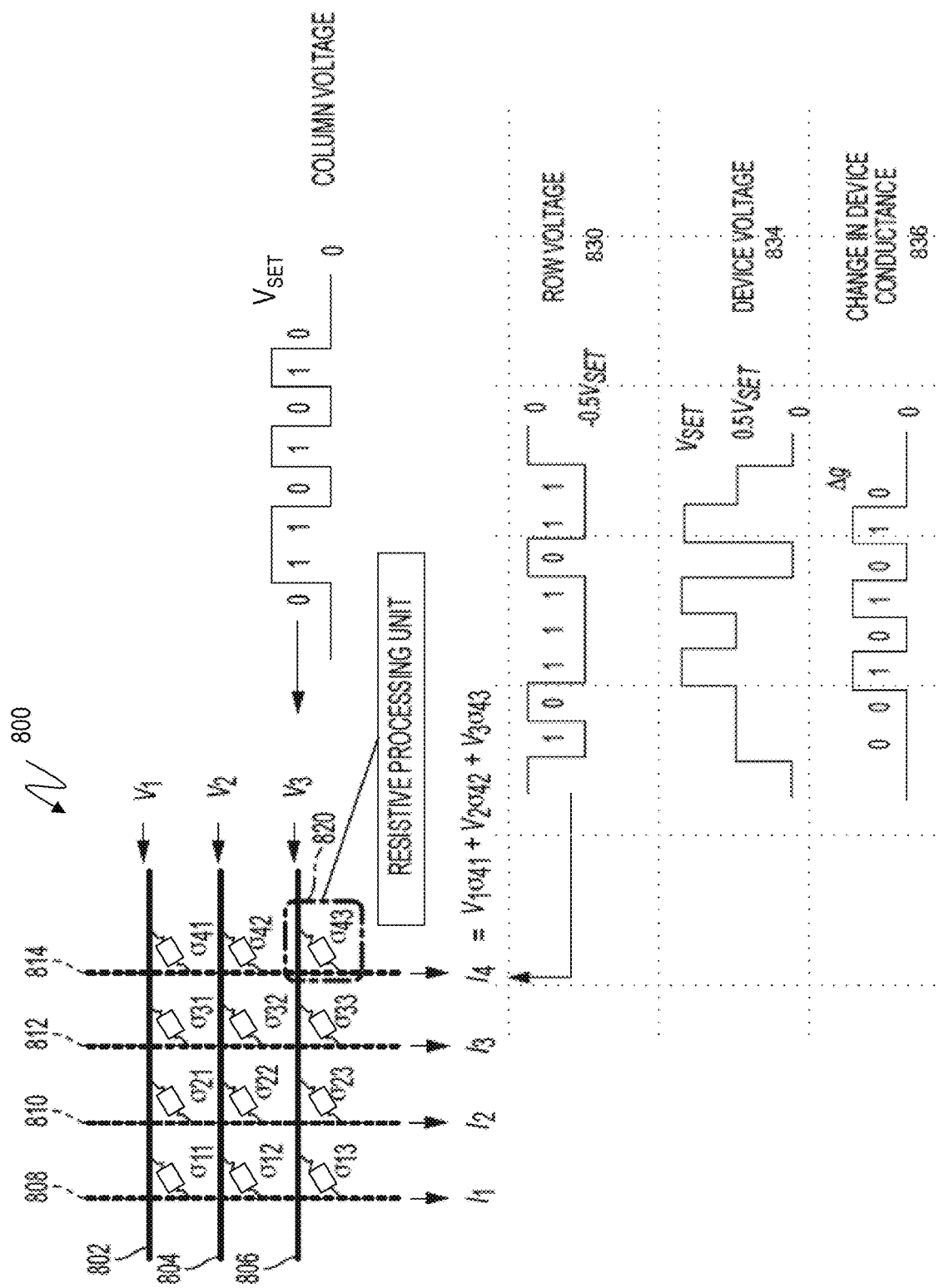
FIG. 8 is a diagram of a two-dimensional (2D) crossbar array.

FIG. 8 is a diagram of a two-dimensional (2D) crossbar array 800 that performs forward matrix multiplication, backward matrix multiplication and weight updates according to the present description. Crossbar array 800 is formed from a set of conductive row wires 802, 804, 806 and a set of conductive column wires 808, 810, 812, 814, which intersect the set of conductive row wires 802, 804, 806. The intersections between the set of row wires and the set of column wires are separated by RPUs 820, each having its own adjustable/updateable weight, depicted as $\sigma_{11}$, $\sigma_{21}$, $\sigma_{31}$, $\sigma_{41}$, $\sigma_{12}$, $\sigma_{22}$, $\sigma_{32}$, $\sigma_{42}$, $\sigma_{13}$, $\sigma_{23}$, $\sigma_{33}$ and $\sigma_{43}$, respectively. For ease of illustration, only one RPU device 820 is labeled with a reference number in FIG. 8.

In forward matrix multiplication, the stored weight (e.g. conduction state) of the RPU device 820 can be read by applying a voltage across the RPU and measuring the current that passes through the RPU device 820. Input voltages $V_1$, $V_2$, $V_3$ are applied to row wires 802, 804, 806, respectively. Each column wire 808, 810, 812, 814 sums the currents $I_1$, $I_2$, $I_3$, $I_4$ generated by each RPU device 820 along the particular column wire. For example, as shown in FIG. 8, the current $I_4$ generated by column wire 814 is according to the equation $I_4 = V_1 \sigma_{41} + V_2 \sigma_{42} + V_3 \sigma_{43}$. Thus, array 800 computes the forward matrix multiplication by multiplying the values stored in the RPUs by the row wire inputs, which are defined by voltages $V_1$, $V_2$, $V_3$. The backward matrix multiplication is very similar. In backward matrix multiplication, voltages are applied at column wires 808, 810, 812, 814 then read from row wires 802, 804, 806. For weight updates, voltages are applied to column wires and row wires at the same time, and the conductance values stored in the relevant RPU devices 820 all update in parallel. Accordingly, the multiplication and addition operations required to perform weight updates are performed locally at each RPU device 820 of array 800 using the RPU device itself plus the relevant row or column wire of array 800. Thus, in accordance with the present invention, no read-update-write cycles (shown in FIG. 7A) are required in array 800.

Continuing with the diagram of FIG. 8, in accordance with one or more embodiments, the operation of a positive weight update methodology for RPU device 820 and its corresponding weight $\sigma_{33}$ at the intersection of conductive row wire 806 and conductive column wire 812 will now be provided. The non-linear switching characteristics of RPU device 820 are used to perform multiplication operations locally at RPU device 820 using stochastic computing as described below. The non-linearity here means that the RPU device 820 does not switch at a low voltage, below a predetermined threshold, while the RPU device 820 switches at a high enough voltage (the predetermined threshold and above). More specifically, the described methodology uses the non-linear switching characteristics of RPU device 820 and stochastic bit streams 830, 832 to perform multiplication operations and the necessary weight updates locally at RPU device 820 without the necessity of other circuit elements. Update generator circuitry (not shown) is provided at the periphery of crossbar array 800 and used as a peripheral "translator" in order to generate necessary voltage pulses in the form of stochastic bit streams (e.g., 830, 832) that would be applied to all RPUs of 2D crossbar array 800 in parallel. In the example illustrated in FIG. 8, the RPU device 820 computes a multiplication of two numbers, 4/8 and 6/8, which are input respectively via the row voltage and column voltage directed to the RPU device 820.

A row voltage sequence or bit stream 830, which is applied to row wire 806, is shown as a sequence of voltage pulses representing weight updates having a voltage of zero or a voltage of $+0.5V_{SET}$. A column voltage sequence or bit stream 832, which is applied to column wire 814, is shown as a sequence of voltage pulses also representing weight updates having either a voltage of zero or a voltage of $-0.5V_{SET}$. In example of FIG. 8, 4/8 is encoded by row voltage sequence 830, and 6/8 is encoded by column voltage sequence 832. The example voltage sequences 830, 832 represent a positive resistance change phase of the weight update. After the positive weight updates are performed, a separate set of sequences with the polarity of the respective voltages reversed can be used to update weights in a negative direction for those weights that need such correction.

Voltage sequence 834 is the voltages applied to RPU device 820 resulting from the difference between row voltage sequence 830 and column voltage sequence 832. Voltage sequence 834 has 3 voltage steps at 0V, $0.5V_{SET}$ and $V_{SET}$. However, because the resistance $\sigma_{43}$ of RPU device 820 only changes for device voltages reaching $V_{SET}$, a single pulse sent either through a column wire or through a row wire is not enough to change the resistance state of RPU device 820. When a column wire sends a voltage at $0.5V_{SET}$, and a row wire sends a voltage at $-0.5V_{SET}$, the resulting $V_{SET}$ pulse applied to the relevant RPU will cause an incremental change in the resistance of the device. Accordingly, the voltage pulses applied to RPU device 820 utilize the nonlinear switching characteristic of RPU device 820 in order to perform a bit wise stochastic AND operation (e.g., as shown in FIG. 7B) locally at RPU device 820. Hence, the resulting change in the stored weight (e.g., $\sigma_{43}$), represented by the change in device conductance 836, of the RPU is proportional to the product of the two numbers (4/8*6/8=3/8) "translated" by update generator circuitry, which is peripheral to crossbar array 800.

Figure 9A:
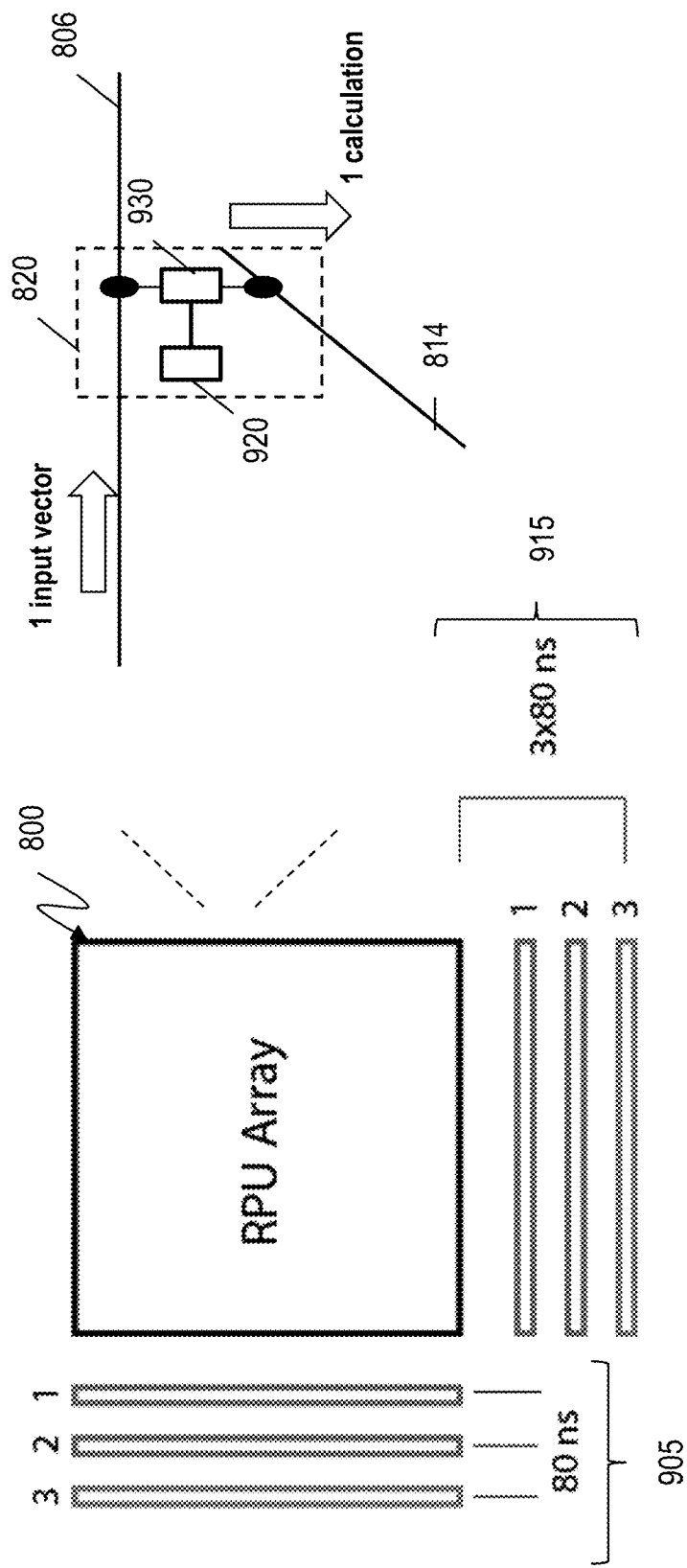
FIG. 9A depicts a RPU device performing a single matrix multiplication calculation operation according to one or more embodiments of the present invention.

FIG. 9A depicts a RPU device performing a single matrix multiplication calculation operation according to one or more embodiments of the present invention. Here, the RPU device 820 includes a single weight storage element 920 and a single weight reader 930. The weight reader 930 is coupled with the row wire 806 and the column wire 814 of the crosspoint array 800. The weight storage element 920, in one or more examples, is a capacitor that stores an electric voltage. In one or more examples, the weight reader element 930 is an FET that couples the weight storage element 920 with the crosspoint array 800. Further, FIG. 9A depicts vectors 905 being input to the RPU array 800 via the row wires. The RPU array 800 stores a matrix that is to be multiplied by the vectors 905 to produce the results that are stored in the output vectors 915.

For example, consider that a matrix-matrix multiplication P×Q. For sake of example, consider that P and Q are 3×3 matrices, however the technical solutions described herein can be used for any sized matrices. The matrix P is decomposed into multiple input vectors 905, in this case, into 3 vectors P1, P2, and P3. The decomposition can be selection of the columns in the matrix P. The matrix Q is stored in the RPU array 800, the weight in each RPU device 820 of the array 800 being the values of the matrix Q. For computing the matrix-matrix multiplication P×Q, the vectors 905 P1, P2, and P3, are sequentially input via the row wires of the RPU array 800. Each RPU device 820, upon receiving the value from the input vectors 905, performs the multiplication operation as described herein and the value is accumulated into the corresponding element in the output array 915. Each input vector 905 generates a corresponding vector 915 upon being multiplied with the matrix stored in the RPU array 800.

Each vector multiplication is sequential. Accordingly, the total time taken to complete the matrix-matrix multiplication P×Q is the sum of each vector multiplication. For example, if each vector multiplication takes 80 nanoseconds, the total time for the matrix multiplication in the above example is 3×80=240 nanoseconds, because there are 3 total vectors. It should be noted that the time for each vector can be different in other examples, and also that the total time can be different based on the number of vectors.

Figure 9B:
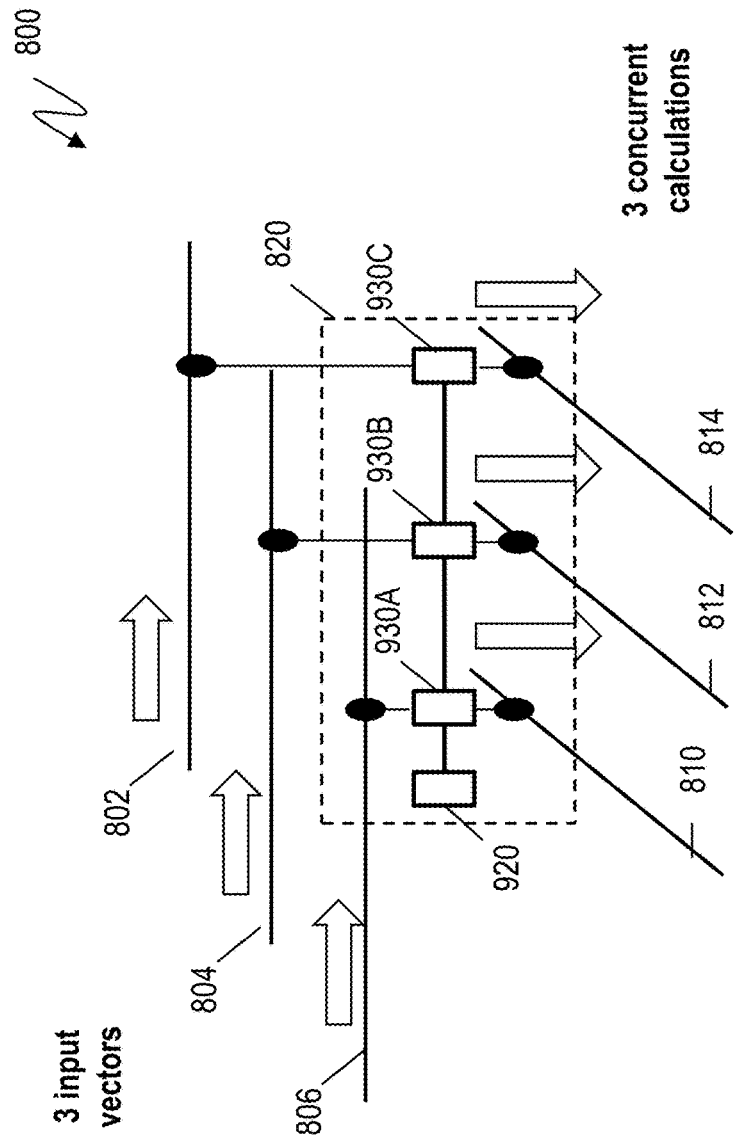
FIG. 9B depicts a RPU device performing multiple matrix multiplication calculation operations according to one or more embodiments of the present invention.

FIG. 9B depicts a RPU device performing multiple matrix multiplication calculation operations according to one or more embodiments of the present invention. Here, the RPU device 820 includes a single weight storage element 920 and multiple weight readers 930; in the ongoing example scenario three weight readers 930A, 930B, and 930C are depicted, however, it is understood that in other examples, the RPU device 820 can include different number of weight readers 930. Each of the weight readers 930 is coupled with a respective row wire from the row wires 802, 804, and 806, as well as a respective column wire from the column wires 810, 812, and 814, of the crosspoint array 800.

Figure 10:
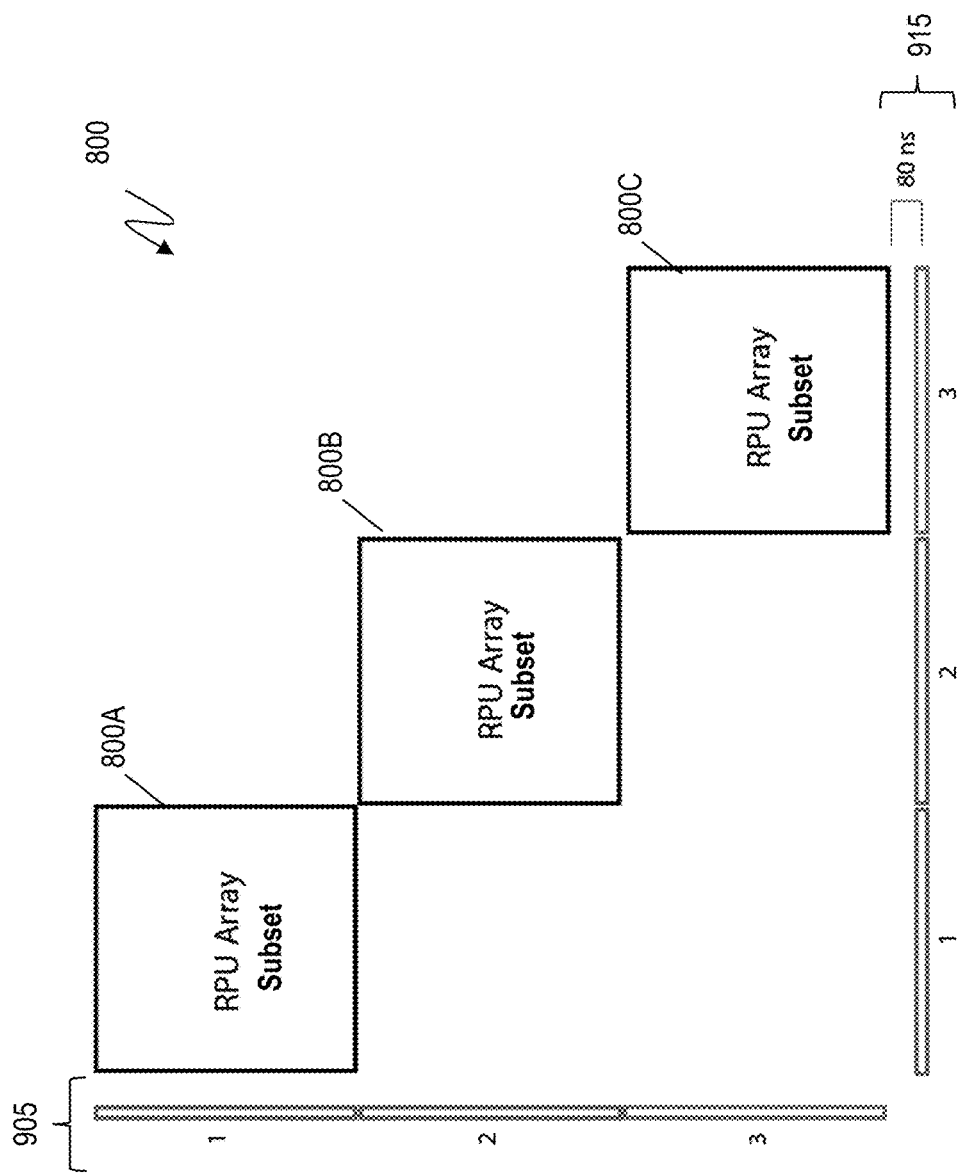
FIG. 10 depicts the concurrent operation for the matrix-matrix multiplication according to one or more embodiments of the present invention.

The multiple weight readers 930 in the RPU device 820 facilitates the matrix-matrix multiplication to be parallelized without storing/copying the weights in multiple physical storages. The throughput of the crosspoint array 800 increases n times, n being the number of weight readers 930 in the RPU device 820, because each of the weight readers 930 operates substantially concurrently. For example, in the ongoing example with 3 weight readers, FIG. 10 depicts the concurrent operation for the matrix-matrix multiplication P×Q.

The array 800 includes the RPU device 820 with the multiple n weight readers 930 at each crosspoint. Each crosspoint has n (e.g. 3) row wires and n (e.g. 3) column wires, the RPU device 820 providing the stored weight to each pair of row-column wires via the n weight readers 930 of the RPU device 820. The multiple vector inputs 905 are supplied simultaneously on respective set of row wires of the array 800. Here, consider that the RPU subset 800A includes row and column wires that receive the vector P1, the RPU subset 800B includes row and column wires that receive the vector P2, and the RPU subset 800C includes row and column wires that receive the vector P3. As depicted in FIG. 10, each RPU subset 800A-C computes a corresponding output vector 915 for the input vector 905.

Accordingly, the RPU array 800, using the RPU devices 820 with the multiple weight readers computes the matrix-matrix multiplication n times faster, as the n column vectors of the P matrix are used concurrently. FIG. 10 depicts that in the above described example of 3 column vectors, computations for all three column vectors are performed in parallel resulting in an overall throughput of 80 nanoseconds (as opposed to the 240 nanoseconds earlier=3 times speedup).

Figure 11:
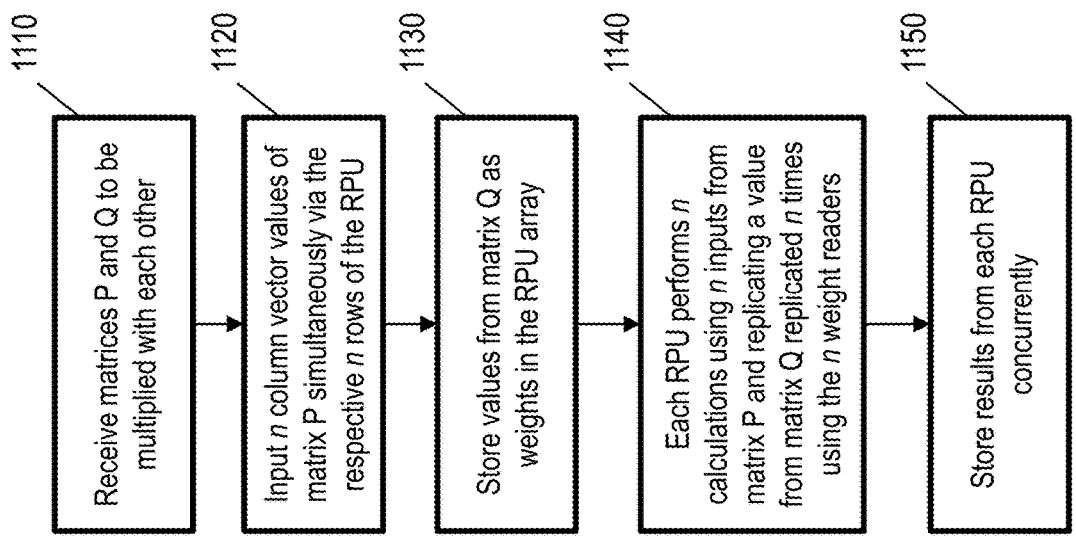
FIG. 11 depicts a flowchart of an example method for performing a matrix-matrix multiplication using the RPU device with multiple weight readers according to one or more embodiments of the present invention.

FIG. 11 depicts a flowchart of an example method for performing a matrix-matrix multiplication using the RPU device with multiple weight readers according to one or more embodiments of the present invention. The method includes receiving the matrices P and Q to be multiplied with each other, at 1110. The input matrices can include any number of rows and columns, n being the maximum number that can be parallelized by the RPU device 820 with n weight readers 930.

The method includes inputting a set of n column vectors from a first input matrix, say P, from the input matrices to the RPU array 800, at 1120. The set of n column vectors are input simultaneously, a value from each of the n vectors being input on a respective row wire of an RPU device 820 (see FIG. 9B). Further, values from a second input matrix, say Q, are stored as weights in the RPU devices 820 in the RPU array 800, at 1130. Each RPU device 820 performs n multiplications using the n inputs from the first matrix and replicating the stored value from the weight storage element 920 n times via the n weight readers 930, at 1140. It should be noted that while the RPU devices 820 described herein perform a multiplication operation using the input values, in other examples, the RPU device 820 can perform other operation, such as an addition, subtraction, multiply-and-add, etc.

The results of the operation from each RPU device 820 are stored concurrently in the output vectors 915, at 1150. The storing includes adding the multiplication values from each column wire.

Here, by storing the values of the matrix Q in the RPU array 800 and inputting a new matrix P multiple times facilitates maximized benefit of the technical solutions herein. For example, in case of the ongoing example with three columns (P1, P2, and P3) of matrix P being used simultaneously, the matrix multiplication using the RPU array 800 can expressed as a loop shown in Table 1.

TABLE 1

Figure 12:
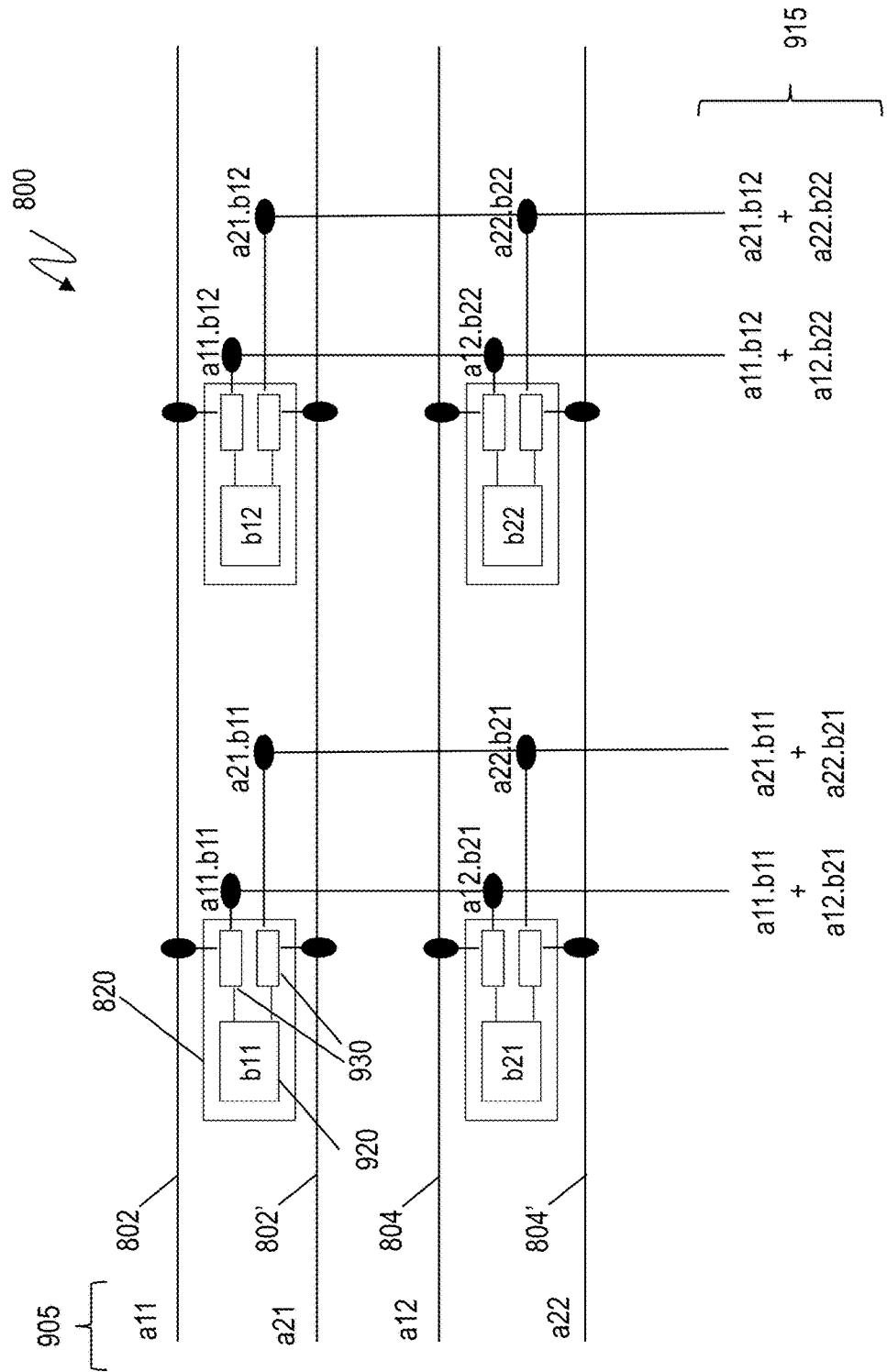
FIG. 12 depicts an operational block diagram for a 2×2 matrix multiplication according to one or more embodiments of the present invention.

1. Receive Q
2. Store Q in the RPU array
3. Receive P
4. Input P1, P2, P3 simultaneously
5. Obtain the result simultaneously
6. Go back to 3 and repeat until all columns in P are used FIG. 12 depicts an operational block diagram for a 2×2 matrix multiplication according to one or more embodiments of the present invention. Here, each RPU device 820 is depicted to have n=2 weight readers 930 and a single weight storage element 920. The two 2×2 input matrices A and B are: A={a11, a12; a21, a22} and B={b11, b12; b21, b22}. The RPU array 800 is depicted to include 4 total RPU devices 820 (although the array 800 can include any other number).

The column vectors of matrix A are used as input vectors 905, which are input concurrently to the RPU devices 820. For example, row wires 802 and 802' of the RPU device 820 receive values a11 and a21 from the two column vectors of matrix A. The values of matrix B are stored in the weight storage elements 920 of the RPU devices 820. As can be seen, the result of the matrix-matrix multiplication is obtained in the output vectors 915.

Figure 13:
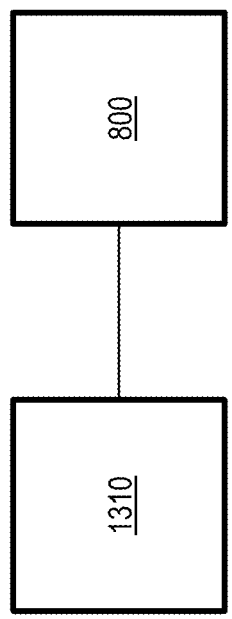
FIG. 13 depicts a system for performing a matrix-matrix multiplication using a crossbar array according to one or more embodiments of the present invention.

FIG. 13 depicts a system 1300 in which the crossbar array 800 is controlled using a controller 1310 for performing the matrix-matrix multiplication among other operations according to one or more embodiments of the present invention. For example, the controller 1310 sends the input matrices to be multiplied by the crossbar array 800. In one or more examples, the controller 1310 stores the values in the crossbar array 800 and sends the input vectors 910. In one or more examples, the controller 1310 and the crossbar array 800 are coupled in a wired or a wireless manner, or a combination thereof. The controller 1310 further sends and instruction/command to the crossbar array 800 to initiate the matrix-matrix multiplication. The controller 1310 further can read the output vectors 915 from the crossbar array 800 after receiving a notification that the matrix-matrix multiplication has been performed. The controller 1310 can be a processing unit, or a computing system, such as a server, a desktop computer, a tablet computer, a phone, and the like. The controller 1310 can include a memory device that has computer executable instructions stored therein, the instructions when executed by the controller cause the matrix-matrix computation.

The technical solutions described herein improve matrix-matrix multiplication performed by RPU arrays by using RPU devices with multiple weight readers shared across a single weight storage element. The technical solutions improves a matrix-matrix computation speed by n times, where n is the number of multiple weight readers in each RPU device. The technical solutions accordingly improve computational technology, and particularly RPU arrays and ANNs implemented using such RPU arrays.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A crossbar array comprising:
  a resistive processing unit (RPU) device at each of a plurality of crosspoints, the RPU device comprising:
    a single weight storage element; and
    a plurality of weight reader elements comprising:
      a first weight reader element that is coupled with a first row wire, the first weight reader configured to compute a first matrix product value using a first value and a stored value, the first value being transmitted via the first row wire and the stored value being stored in the single weight storage element; and
      a second weight reader element that is coupled with a second row wire to compute a second matrix product value of a second value and said stored value, the second value being transmitted via the second row wire.

2. The crossbar array of claim 1, wherein the first weight reader element is further coupled to a first column wire, the first matrix product value being transmitted via the first column wire.

3. The crossbar array of claim 2, the first weight reader element configured to compute the first matrix product value by multiplying the first value and the stored value, and adding a sum value being transmitted via the first column wire.

4. The crossbar array of claim 3, wherein the second weight reader element is further coupled to a second column wire, the second matrix product value being transmitted via the second column wire.

5. The crossbar array of claim 4, wherein the second weight reader element is configured to compute the second matrix product value by:
  multiplying the second value and the stored value; and
  adding a sum value being transmitted via the second column wire.

6. The crossbar array of claim 1, wherein the RPU devices compute corresponding matrix product values concurrently.

7. The crossbar array of claim 1, wherein the RPU devices:
  receives column vectors of a first matrix via corresponding row wires; and
  stores values of a second matrix that is to be multiplied with the first matrix.

8. A system comprising:
  a controller; and
  a crossbar array coupled with the controller, the crossbar array configured to perform a matrix-matrix multiplication, the crossbar array receives a first input matrix and a second input matrix from the controller, the crossbar array comprising:
    a resistive processing unit (RPU) device at each of a plurality of crosspoints, the RPU device comprising:
      a single weight storage element; and a plurality of weight reader elements comprising:
a first weight reader element that is coupled with a first row wire, the first weight reader configured to compute a first matrix product value using a first value and a stored value, the first value being transmitted via the first row wire and the stored value being stored in the single weight storage element; and
a second weight reader element that is coupled with a second row wire to compute a second matrix product value of a second value and said stored value, the second value being transmitted via the second row wire.

9. The system of claim 8, wherein the first weight reader element is further coupled to a first column wire, the first matrix product value being transmitted via the first column wire.

10. The system of claim 9, the first weight reader element configured to compute the first matrix product value by multiplying the first value and the stored value, and adding a sum value being transmitted via the first column wire.

11. The system of claim 10, wherein the second weight reader element is further coupled to a second column wire, the second matrix product value being transmitted via the second column wire.

12. The system of claim 11, wherein the second weight reader element configured to compute the second matrix product value by:
multiplying the second value and the stored value; and
adding a sum value being transmitted via the second column wire.

13. The system of claim 8, wherein the RPU device computes corresponding matrix product values concurrently.

14. The system of claim 8, wherein the RPU device:
receives column vectors of the first input matrix via corresponding row wires; and
stores values of the second input matrix that is to be multiplied with the first input matrix.

15. A method for performing matrix-matrix multiplication, the method comprising:
receiving, by a crossbar array, a first input matrix and a second input matrix for performing the matrix-matrix multiplication; and
performing the matrix-matrix multiplication by the crossbar array in parallel using a resistive processing unit (RPU) device at each of a plurality of crosspoints, the RPU device comprising:
a single weight storage element; and
a plurality of weight reader elements; wherein performing the matrix-matrix multiplication comprises:
computing, by a first weight reader element from the plurality of weight readers, the first weight reader element is coupled with a first row wire, a first matrix product value using a first value and a stored value, the first value being transmitted via the first row wire and the stored value being stored in the single weight storage element; and
computing, by a second weight reader element from the plurality of weight readers, the second weight reader element is coupled with a second row wire, a second matrix product value of a second value and said stored value, the second value being transmitted via the second row wire.

16. The method of claim 15, wherein the first weight reader element is further coupled to a first column wire, the first matrix product value being transmitted via the first column wire.

17. The method of claim 16, wherein computing the first matrix product value by the first weight reader element comprises multiplying the first value and the stored value, and adding a sum value being transmitted via the first column wire.

18. The method of claim 17, wherein the second weight reader element is further coupled to a second column wire, the second matrix product value being transmitted via the second column wire.

19. The method of claim 18, wherein computing the second matrix product value by the second weight reader element comprises:
multiplying the second value and the stored value; and
adding a sum value being transmitted via the second column wire.

20. The method of claim 15, wherein the RPU device:
receives column vectors of the first input matrix via corresponding row wires; and
stores values of the second input matrix.

* * * * *